United States Patent [19]

Kanayama et al.

[11] 4,385,228
[45] May 24, 1983

[54] DISPLAY DEVICE FOR TAPE RECORDER WITH AUTOMATIC SHUT OFF AND RESET INHIBITING

[75] Inventors: Katsumi Kanayama; Kenzi Furuta; Kazuyasu Motoyama, all of Hachioji, Japan

[73] Assignee: Olympus Optical Co., Ltd., Tokyo, Japan

[21] Appl. No.: 151,471

[22] Filed: May 19, 1980

[30] Foreign Application Priority Data

May 28, 1979 [JP] Japan .................................. 54-65835

[51] Int. Cl.³ ............................................ G06M 3/06
[52] U.S. Cl. ........................................ 377/112; 377/18
[58] Field of Search ....... 235/92 DN, 92 MP, 92 EA; 364/561, 707; 360/72.1; 242/DIG. 1

[56] References Cited

U.S. PATENT DOCUMENTS

| | | | |
|---|---|---|---|
| 3,941,989 | 3/1976 | McLaughlin et al. | 364/707 |
| 3,955,185 | 5/1976 | Nishimura | 364/707 |
| 4,189,636 | 2/1980 | Satoh | 235/92 MP |
| 4,232,371 | 11/1980 | Kamoto | 364/561 |
| 4,237,373 | 12/1980 | Okatani et al. | 235/92 EA X |
| 4,239,957 | 12/1980 | Satoh et al. | 235/92 DN |

Primary Examiner—David H. Malzahn
Attorney, Agent, or Firm—Frishauf, Holtz, Goodman & Woodward

[57] ABSTRACT

In a tape recorder including a circuit for generating a pulse signal corresponding to an amount of tape travel, an electronic counter circuit is provided which includes a counter for counting pulses and a display section for displaying a count value. The electronic counter circuit further includes a memory for receiving voltage at all times from a power supply and storing a count value and a control section adapted to maintain the energization of the display section for a predetermined time period after the operation of the tape recorder is stopped and to stop the energization of the display section thereafter, while inhibiting the resetting of the counter.

9 Claims, 9 Drawing Figures

F I G. 2A 
F I G. 2B 
F I G. 2C 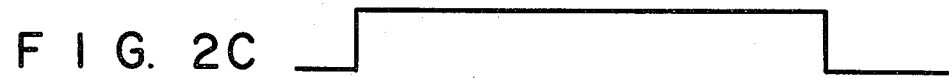
F I G. 2D 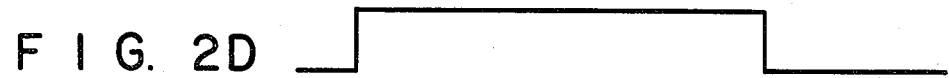
F I G. 2E 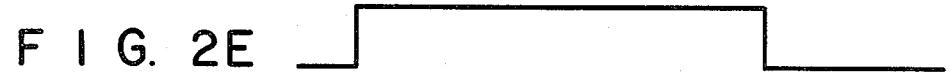
F I G. 2F 
F I G. 2G 
F I G. 2H 

DISPLAY DEVICE FOR TAPE RECORDER WITH AUTOMATIC SHUT OFF AND RESET INHIBITING

BACKGROUND OF THE INVENTION

This invention relates to an electronic counter circuit for use in a tape recorder etc.

In general, a tape recorder includes a tape counter representing an amount of tape travel. In the prior art, a mechanical type counter has been primarily used in which a digit board rotates in interlock with the rotation of a reel shaft and which displays a corresponding count value. Recently, however, an electronic counter circuit is used which counts pulses generated according to the rotation of the reel shaft and displays a corresponding count value. The electronic counter circuit can effect various controls using count values. When the running of the tape reaches a predetermined count value during the fast forward or rewind mode it is possible to automatically stop the running of the tape. Since the display section of the electronic counter circuit dissipates much power, it is desirable that the electronic counter circuit be disconnected from the power supply at the time of the stopping of tape travel. However, the running of the tape is temporarily stopped when switching is made from the playback mode to the rewind mode, resetting the counter and thus erasing a count value on a display section. For this reason, in the prior art devices the count value corresponds to an amount of tape travel as measured from each stopping position of the tape, not an absolute amount of tape travel as measured from the initial position where the tape is fully wound on one reel shaft. One approach to this problem is to provide a display switch separately from the operation switch of the tape recorder so that a supply of a power supply voltage to the display section can be controlled. This approach complicates an arrangement involved, there being a risk that a count value on the display section will be erased by an erroneous operation of the additional switch. The count value of the counter is stored in the memory to which a power supply voltage is supplied at all times. However, there are the cases where it is desired to reset the counter for the replacement of the tape and so on. In order to attain this object a reset switch is provided, but even in this case there is a possibility that the counter will be reset, like the display switch, by the erroneous operation of the reset switch.

SUMMARY OF THE INVENTION

It is accordingly the object of this invention to provide an electronic counter circuit which counts pulses generated in response to a power supply voltage and erases a count value a predetermined time period after the generation of the pulses is stopped, and in which the count value is reset by the energization of a reset means, the reset means being not energized while the generation of the pulse is stopped.

The object of this invention can be attained by the electronic counter circuit comprising a power supply terminal, pulse generating means, means for generating a pulse signal in response to travel of the tape, counter means for counting pulses from the pulse generating means, storing means for storing a count value of the counter means, means for displaying the count value stored in the storing means and control means connected to the power supply terminal, displaying means and counter means and adapted to stop the supply of voltage to the displaying means a predetermined time after the travel of the tape is stopped, while supplying a reset inhibiting signal to the counting means.

BRIEF DESCRIPTION OF THE DRAWINGS

FIGS. 2A to 2H show the waveforms of the respective portions of the circuit of FIG. 1.

DETAILED DESCRIPTION OF THE INVENTION

Figure 1:
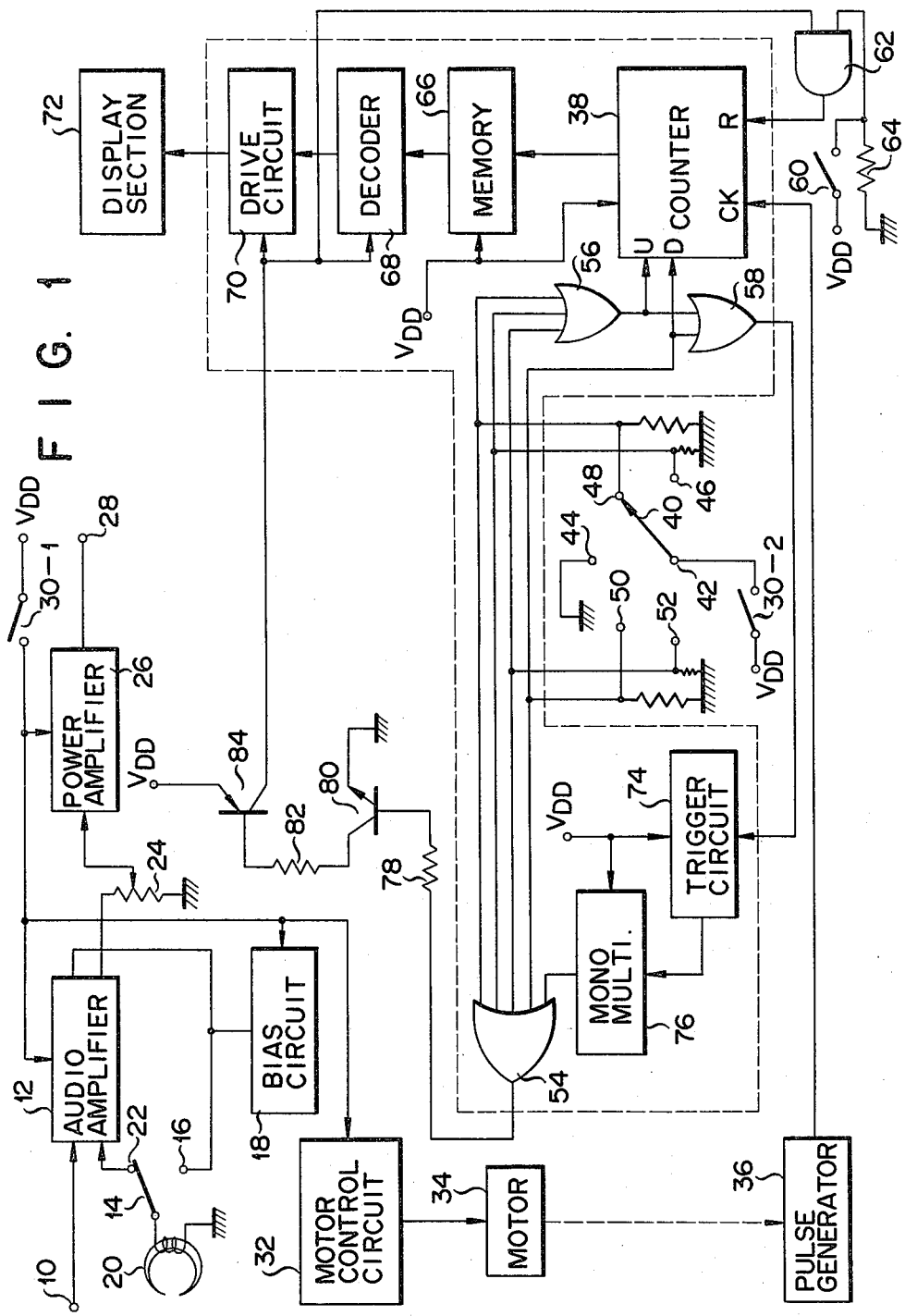
FIG. 1 is a circuit diagram of an electronic counter circuit according to one embodiment of the invention.

An electronic counter circuit of this invention as applied to a tape recorder will be explained below by referring to the accompanying drawings.

In FIG. 1 is shown an input terminal 10 to which an audio signal from a microphone or tuner not shown is supplied. The input terminal 10 is connected through an audio amplifier 12 to a record terminal 16 of a record/playback changeover switch 14. The output of a bias circuit 18 is also connected to the record terminal 16 of the record/playback changeover switch 14. A fixed contact of the switch 14 is connected to a magnetic head 20 and a playback terminal 22 of the switch 14 is connected to a potentiometer 24 through the audio amplifier 12. The switch 14 is switched by the depression of an operation button of a tape recorder not shown and the magnetic head 20 is contacted with a magnetic tape in response to the depression of the operation button. The output of the potentiometer 24 is supplied through a power amplifier 26 to an output terminal 28. A signal on the output terminal 28 is translated by a speaker not shown into sound. A power supply terminal $V_{DD}$ is adapted to receive DC voltage and is connected through a switch 30-1 to the audio amplifier 12, power amplifier 26, bias circuit 18 and a motor control circuit 32. The switch 30-1 is closed by the depression of buttons other than a stop button and is opened by operation of the stop button. The motor control circuit 32 supplies a control signal for instructing a rotation speed and rotation direction to a motor 34 according to the depression of the operation button. A pulse generator 36 is energized by the rotation of a reel shaft and the output of the generator 36 is supplied to a clock input terminal CK of an up/down counter 38. A reed switch, for example, serves as a pulse generator 36. If the reed switch is arranged in the neighborhood of the reel shaft of the tape recorder and a permanent magnet is provided on the outer periphery of the reel shaft, the reed switch is opened and closed according to the rotation of the reel shaft to produce pulse signals. Alternatively, a light reflection section, in combination with a light emitting element and light receiving element, may be provided in the portion of the outer periphery of the reel shaft so as to produce pulses in optical fashion. In short, the pulse generator 36 will suffice if only pulses are generated according to the rotation of the reel shaft.

A mode switch 40 is provided which is switched according to the depression of the operation button. The power supply terminal $V_{DD}$ is connected through a switch 30-2 to a fixed contact 42 of the mode switch 40. Fixed contacts 44, 46, 48, 50 and 52 of the mode switch 40 are selected when a stop button, record button, playback button, rewind button and fast forward button are depressed respectively. The switch 30-2 is closed in interlock with the switch 30-1. A stop terminal 44 of the mode switch 40 is grounded and the record terminal 46, playback terminal 48, rewind terminal 50 and fast forward terminal 52 are connected to the corresponding input terminals of an OR gate 54. The record terminal 46, playback terminal 48 and fast forward terminal 52 are connected through an OR gate 56 to an up count terminal U of the up/down counter 38 and to one input terminal of an OR gate 58. The rewind terminal 50 is connected to a down count terminal D of the up/down counter 38 and to the other input terminal of the OR gate 58. The power supply terminal $V_{DD}$ is connected through a reset switch 60 to one input terminal of an AND gate 62. A junction between the reset switch 60 and the input terminal of the AND gate 62 is grounded through a resistor 64. The output terminal of the AND gate 62 is connected to a reset terminal R of the counter 38. The output of the counter 38 is supplied to a memory 66 and the output of the memory 66 is supplied to a display section 72 through a decoder 68 and drive circuit 70. The decoder 68 decodes a binary output of the counter 38 into a segment signal for display. The power supply terminal $V_{DD}$ is connected to the counter 38 and memory 66.

The output signal of the OR gate 58 is supplied to a trigger circuit 74 and the output signal of the trigger circuit 74 is supplied to a monostable multivibrator 76. The power supply terminal $V_{DD}$ is connected to the trigger circuit 74 and multivibrator 76. The output of the monostable multivibrator 76 is supplied to the OR gate 54 and the output of the OR gate 54 is connected through a resistor 78 to the base of an NPN transistor 80. The emitter of the transistor 80 is grounded and the collector of the transistor 80 is connected through a resistor 82 to the base of a PNP transistor 84. The emitter of the transistor 84 is connected to the power supply terminal $V_{DD}$ and the collector of the transistor 84 is connected to the AND gate 62, decoder 68 and drive circuit 70. That area enclosed by the broken line in FIG. 1 corresponds to an IC section.

The operation of the electronic counter circuit of this invention will be explained below by referring to the waveforms shown in FIGS. 2A to 2H.

Suppose that DC voltage is applied to the power supply terminal $V_{DD}$ with the tape recorder at the stop mode. At this time, the mode switch 40 is connected to the stop terminal 44 and thus the switch 30-1 and 30-2 are in the open state. As a result, the signals of the respective circuit sections are all at the low levels.

The mode switch 40 is switched to the playback terminal 48 on depression of the playback button and switches 30-1 and 30-2 connected to the power supply terminal $V_{DD}$ are closed, permitting power supply to the respective portions of the circuit. By the depression of the playback button, the record/playback switch 14 is coupled to the playback terminal 22 and the magnetic head 20 is contacted with the magnetic tape. The power supply voltage is supplied to the motor control circuit 32, causing a control signal for instructing a rotation direction and rotation speed corresponding to the playback made to the motor 34 so as to set the tape recorder in a playback mode. When this occurs, the motor 34 is rotated and a signal recorded on the tape is detected by the magnetic head 20 and supplied through the audio amplifier 12 and power amplifier 26 to a speaker where it is reproduced. When the motor 34 is rotated, a pulse signal as shown in FIG. 2A is supplied from the pulse generator 36 to the clock input terminal CK of the counter 38. Since a signal on the playback terminal 48 of the mode switch 40 becomes a high level as shown in FIG. 2B the output signals of the OR gates 54 and 56 become high levels as shown in FIGS. 2C and 2D, respectively. The output signal of the OR gate 56 is supplied to the up count terminal U of the counter 38 and to OR gate 58. As a result, the counter 38 starts its up counting and the output signal of the OR gate 58 becomes a high level as shown in FIG. 2E. As a result, the counter 38 shows a count value according to an amount of running of the tape and the count value of the counter 38 is stored in the memory 66. By the output signal of the OR gate 54 the transistors 80 and 84 are rendered conductive and the collector signal of the transistor 84 becomes a high level as shown in FIG. 2F. The decoder 68 and drive circuit 70 are energized by the collector signal of the transistor 84 to permit the contents of the memory 66 to be displayed on the display section 72.

Upon depression of the stop button the mode switch 40 is switched to the stop terminal 44 and the switches 30-1 and 30-2 are opened to cause the supply of power supply voltage to each portion of the circuit to be stopped. Consequently, the motor stops its rotation, ceasing the generation of the pulse signal from the pulse generator 36 as shown in FIG. 2A. Since a signal on the playback terminal 48 of the switch 40 becomes a low level, the output signals of the OR gates 56 and 58 become low levels as shown in FIGS. 2D and 2E. The trigger circuit 74 and monostable multivibrator 76, even when the tape recorder is at a stop mode, are energized as they are connected directly to the power supply terminal $V_{DD}$. The trigger circuit 74 detects a fall of the output signal of the OR gate 58 which is shown in FIG. 2E, to supply one pulse as shown in FIG. 2G to the monostable multivibrator 76. The monostable multivibrator 76 delivers a high level signal as shown in FIG. 2H for a predetermined time period in response to this pulse. The output signal of the monostable multivibrator 76 is supplied to the OR gate 54 and the output signal of the OR gate 54 maintains its high level for a predetermined time period even after a signal from the mode switch 40 becomes a low level. Thus, the transistors 80 and 84 maintain their conductive states and, even after the tape recorder assumes a stop mode, the collector output of the transistor 84 maintains its high level as shown in FIG. 2F. For this reason, the count value is not erased immediately after the tape recorder assumes a stop mode and is automatically erased after a predetermined time period. In this case, however, the count value is stored in the memory 66, as the counter 38 and memory 66 are connected directly to the power supply terminal $V_{DD}$. For this reason, after the restarting of the tape recorder, counting is continued from the count value assumed when the tape recorder was stopped and in consequence the count value represents an absolute amount of tape travel. Since the counter 38 and memory 66 dissipate less power than the decoder 68 and drive circuit 70, it does not matter even if the power supply voltage is supplied at all times to the counter 38 and the memory 66.

Although this invention has been explained in connection with the playback mode, the same control operation is effected with respect to the other operation modes and further explanation thereof is omitted. It is to be noted, however, that in the rewind mode the counter 38 effects a down count operation because the rewind terminal 50 of the mode switch 40 is connected to the down count terminal D of the up/down counter 38.

Where the count value is to be reset for the replacement of the tape for example, a reset signal has to be supplied to the reset terminal R of the counter 38 because the power supply voltage is supplied at all times to the counter 38. A power supply voltage signal from the reset switch 60 is supplied through the AND gate 62 to the reset terminal R of the counter 38 and even if the reset switch 60 is closed the counter 38 is not reset when the transistor 84 is in the OFF state. That is, the counter 38 is not reset when the count value is not displayed on the display section 72. In other words, even if the reset switch 60 is inadvertently closed during the stop mode time of the tape recorder the count value is not reset. If after the replacement of the tape the reset switch 60 is closed simultaneously with the restarting of the tape recorder the count value is reset and counting is restarted.

This invention is not restricted to the above-mentioned embodiment. For example, if a power supply voltage is connected to the decoder and driver circuit through a constant voltage circuit and boosting circuit, dynamic display can be effected.

What we claim is:

1. A device for displaying a tape running position of a tape recorder comprising:
   a source of power;
   mode setting means for selectively setting an operation mode or a non-operating mode of the tape recorder;
   tape running means which is rotatable for running a magnetic tape in the tape recorder;
   pulse generating means coupled to said tape running means for generating a pulse signal output according to the rotation of said tape running means;
   counter means coupled to said pulse generating means for counting pulses of the pulse signal output of said pulse generating means;
   display means coupled to said power source and to said counter means for displaying the count value of said counter means;
   reset means coupled to said counter means for selectively resetting said counter means;
   signal producing means coupled to said mode setting means for producing an output signal for a predetermined period of time after detecting that said mode setting means sets the tape recorder in a non-operating mode;
   switching means coupled to said signal producing means for stopping power supply from said power source to said display means in response to the termination of the output signal from said signal producing means; and
   reset inhibiting means coupled to said reset means and responsive to the termination of the output signal from said signal producing means for inhibiting a resetting of said counter means.

2. The device of claim 1, wherein said signal producing means includes:
   a monostable multivibrator for producing a signal for a predetermined period of time when triggered; and
   a trigger circuit coupled to said mode setting means for triggering said multivibrator responsive to said mode setting means setting the tape recorder in a non-operating mode.

3. The device of claim 1, wherein:
   said reset means includes a switch which is selectively closed for producing a reset signal; and
   said reset inhibiting means includes an AND gate which is supplied with the reset signal of said reset switch and an output signal from said switching means for stopping power supply;
   said counter means having a reset terminal coupled to receive an output signal of said AND gate for resetting said counter means.

4. The device of claim 1, wherein said counter means is continuously supplied with power from said source of power.

5. The device of claim 1, wherein said display means comprises:
   a decoder for decoding data supplied from said counter means into data for display;
   a display element; and
   a driver circuit for driving said display element in response to the output of said decoder;
   said decoder and driver circuit being connected to said switching means for stopping power supply such that power supply to said decoder and driver circuit is stopped in response to termination of the output signal from said signal producing means.

6. The device of claim 1, wherein said reset inhibiting means is responsive to setting of the tape recorder in an operating mode to permit resetting of said counter means by said reset means while the tape recorder is in said operating mode.

7. The device of claim 1, further comprising gate means coupled to said mode setting means and to said signal producing means for supplying an output signal to said switching means to keep said switching means in a state supplying power to said display means while said tape recorder is in an operation mode and for said predetermined period of time after detecting that said tape recorder is in a non-operating mode, said gate means causing said switching means to be operative to stop supply of power to said display means after said predetermined period of time, and for simultaneously causing said reset inhibiting means to inhibit a resetting of said counter means.

8. The device of claim 7, wherein:
   said reset means includes a switch which is selectively closed for producing a reset signal; and
   said reset inhibiting means includes an AND gate which is supplied with the reset signal of said reset switch and an output signal from said switching means for stopping power supply;
   said counter means having a reset terminal coupled to receive an output signal of said AND gate for resetting said counter means.

9. The device of claim 7, wherein said signal producing means includes:
   a monostable multivibrator for producing a signal for a predetermined period of time when triggered; and
   a trigger circuit coupled to said mode setting means for triggering said multivibrator responsive to said mode setting means setting the tape recorder in a non-operating mode.

* * * * *